(12) United States Patent
Dunn

(10) Patent No.: US 8,594,695 B2
(45) Date of Patent: Nov. 26, 2013

(54) USING LOCATION INFORMATION TO SET RADIO TRANSMITTER CHARACTERISTICS FOR REGULATORY COMPLIANCE

(75) Inventor: Sean Dunn, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 826 days.

(21) Appl. No.: 11/707,584

(22) Filed: Feb. 16, 2007

(65) Prior Publication Data

US 2008/0200180 A1 Aug. 21, 2008

(51) Int. Cl.
*H01Q 11/12* (2006.01)
*H04B 1/04* (2006.01)
*H04B 7/00* (2006.01)
*H04M 11/04* (2006.01)
*H04W 24/00* (2009.01)

(52) U.S. Cl.
USPC .............. 455/456.1; 455/125; 455/404.2; 455/456.6; 455/522

(58) Field of Classification Search
USPC .......... 455/456.1–457, 552.1–553.1, 91, 455/102–103, 522, 414.1–412.4, 125, 455/404.1–404.2
See application file for complete search history.

(56) References Cited

U.S. PATENT DOCUMENTS

| | | | |
|---|---|---|---|
| 5,404,355 A | 4/1995 | Raith | |
| 5,678,182 A | 10/1997 | Miller et al. | |
| 6,556,825 B1 * | 4/2003 | Mansfield | 455/426.1 |
| 6,799,052 B2 * | 9/2004 | Agness et al. | 455/456.4 |
| 6,889,067 B2 | 5/2005 | Willey | |
| 6,898,640 B1 | 5/2005 | Kurita et al. | |
| 6,937,868 B2 * | 8/2005 | Himmel et al. | 455/456.4 |
| 6,995,708 B2 | 2/2006 | Schmidt | |
| 7,194,273 B2 * | 3/2007 | Vaudreuil | 455/456.3 |
| 7,218,912 B2 * | 5/2007 | Erskine et al. | 455/405 |
| 7,263,367 B1 * | 8/2007 | Sabot | 455/456.1 |
| 7,292,551 B2 | 11/2007 | Lim et al. | |
| 7,319,876 B2 | 1/2008 | Jha et al. | |
| 7,324,481 B2 * | 1/2008 | Kobayashi et al. | 370/334 |
| 7,421,274 B1 | 9/2008 | Hraby et al. | |
| 7,860,516 B2 * | 12/2010 | Hodges et al. | 455/456.1 |
| 2003/0087647 A1 * | 5/2003 | Hurst | 455/456 |
| 2004/0156329 A1 | 8/2004 | Bck et al. | |
| 2005/0136949 A1 * | 6/2005 | Barnes, Jr. | 455/461 |
| 2005/0146460 A1 | 7/2005 | Westerberg | |

(Continued)

FOREIGN PATENT DOCUMENTS

EP 1037482 9/2000
JP 09-043338 A 2/1997

(Continued)

OTHER PUBLICATIONS

Office Action received for Chinese Patent Application No. 200880001504.8, mailed on Apr. 25, 2012, 15 pages of Office Action including 10 pages of English Translation.

(Continued)

*Primary Examiner* — Simon Nguyen
(74) *Attorney, Agent, or Firm* — Kacvinsky Daisak PLLC

(57) ABSTRACT

A method of dynamically adjusting a wireless transceiver may include acquiring a geographical location of the wireless transceiver and determining transmission characteristics that are compliant with wireless regulations covering the geographical location. The wireless transceiver may be adjusted to conform to the transmission characteristics, and data may be transmitted with the adjusted wireless transceiver.

25 Claims, 3 Drawing Sheets

(56) References Cited

U.S. PATENT DOCUMENTS

| | | |
|---|---|---|
| 2005/0181808 A1* | 8/2005 | Vaudreuil .................. 455/456.3 |
| 2005/0221841 A1* | 10/2005 | Piccionelli et al. ........ 455/456.3 |
| 2005/0272445 A1 | 12/2005 | Zellner |
| 2006/0030356 A1* | 2/2006 | Haub et al. ................. 455/553.1 |
| 2006/0089134 A1 | 4/2006 | Moton, Jr. et al. |
| 2006/0099967 A1* | 5/2006 | Colvin et al. ............. 455/456.4 |
| 2006/0135067 A1* | 6/2006 | Dunko ......................... 455/41.2 |
| 2006/0189279 A1 | 8/2006 | Kobayashi et al. |
| 2007/0032225 A1* | 2/2007 | Konicek et al. ............... 455/417 |
| 2007/0037605 A1* | 2/2007 | Logan ........................... 455/567 |
| 2007/0042789 A1* | 2/2007 | Moton et al. .............. 455/456.1 |
| 2007/0249316 A1* | 10/2007 | Rao ............................ 455/343.1 |
| 2008/0080447 A1* | 4/2008 | Grube et al. ................. 370/342 |
| 2008/0102786 A1* | 5/2008 | Griffin ....................... 455/404.2 |
| 2009/0197584 A1* | 8/2009 | Snow et al. ................... 455/418 |
| 2010/0093375 A1* | 4/2010 | Buckley et al. ............ 455/456.3 |
| 2010/0173649 A1* | 7/2010 | Ishii ........................... 455/456.2 |
| 2011/0244887 A1* | 10/2011 | Dupray et al. ............. 455/456.2 |

FOREIGN PATENT DOCUMENTS

| | | |
|---|---|---|
| JP | 2000-197118 A | 7/2000 |
| JP | 2003-511952 A | 3/2003 |
| KR | 10-0572697 | 4/2006 |
| WO | 2005099293 A1 | 10/2005 |
| WO | 2008/100965 A1 | 8/2008 |

OTHER PUBLICATIONS

Office Action received for Russian Patent Application No. 2009124219, mailed on Oct. 13, 2011, 9 pages of Office Action including 4 pages of English Translation.

Office Action received for Russian Patent Application No. 2009124219, mailed on Apr. 5, 2011, 10 pages of Office Action including 3 pages of English Translation.

Office Action Russian Patent Application No. 2009124219, Mailed on Oct. 11, 2010, 7 pages of Office Action including 2 pages of English Translation.

Office Action received for Korean Patent Application No. 2009-7013485, mailed on Feb. 10, 2011, 6 pages of English Translation.

Office Action received for Korean Patent Application No. 2009-7013485, mailed on Oct. 20, 2011, 4 pages of English Translation.

Office Action received for Japanese Patent Application No. P2009-544329, mailed on Apr. 4, 2011, 4 pages of Office Action including 2 pages of English Translation.

International Search Report and Written opinion received for PCT Application No. PCT/US2008/053761, mailed on May 28, 2008, 11 pages.

* cited by examiner

USING LOCATION INFORMATION TO SET RADIO TRANSMITTER CHARACTERISTICS FOR REGULATORY COMPLIANCE

BACKGROUND

Implementations of the claimed invention generally may relate to wireless communication, and in particular to adjusting the characteristics of wireless transceivers to comply with various regulatory requirements.

Mobile devices frequently include wireless transceivers. Such transceivers typically operate with fixed characteristics, such as transmission frequency and power. In large part, such transmission characteristics may be determined by the regulatory regime for the wireless spectrum in the selling locale of the mobile device. In the United States, for example, use of the wireless spectrum is regulated by the Federal Communications Commission (FCC), although other countries may have similar regulatory regimes for the wireless spectrum. Typically, a mobile device destined for sale in a particular country may generally be designed with fixed transmission characteristics that comply with the regulatory regime of that country.

With the globalization of both manufacture and use of mobile device, however, it may be desirable for mobile devices to comply with multiple wireless regulatory regimes.

BRIEF DESCRIPTION OF THE DRAWINGS

The accompanying drawings, which are incorporated in and constitute a part of this specification, illustrate one or more implementations consistent with the principles of the invention and, together with the description, explain such implementations. The drawings are not necessarily to scale, the emphasis instead being placed upon illustrating the principles of the invention. In the drawings.

DETAILED DESCRIPTION

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of the claimed invention. However, it will be apparent to those skilled in the art having the benefit of the present disclosure that the various aspects of the invention claimed may be practiced in other examples that depart from these specific details. In certain instances, descriptions of well known devices, circuits, and methods are omitted so as not to obscure the description of the present invention with unnecessary detail.

Figure 1:
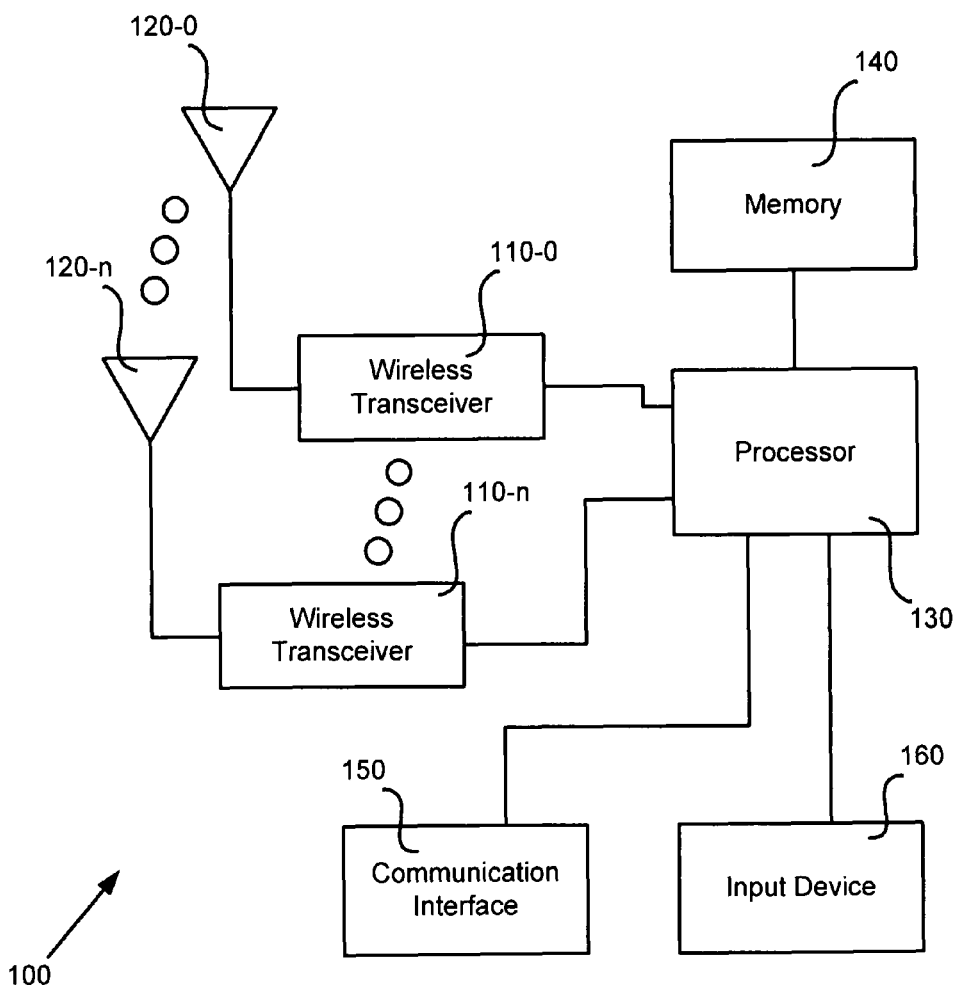
FIG. 1 illustrates an example wireless communication system according to some implementations.

FIG. 1 is a diagram illustrating an example of a mobile system 100 in accordance with one implementation consistent with the principles of the invention. In some implementations, mobile system 100 may include a general-purpose computing device such as a notebook computer or handheld device. In some implementations, mobile system 100 may include a communications device such as a phone or device with telephonic functionality. In some implementations, mobile system 100 may include an entertainment device such as a media player (e.g., for consuming text, audio, video, etc.). In some implementations, mobile system 100 may include a combination of any of the above devices, or mobile system 100 may include a sub-system (e.g., plug-in module or sub-assembly) that handles wireless communication in a mobile device.

Mobile system 100 may include one or more wireless transceivers 110-0, 110-1, ..., 110-$n$ (collectively transceivers 110), one or more antennas 120-0, 120-1, ..., 120-$n$ (collectively antennas 120), a processor 130, a memory 140, a communication interface 150, and an input device 160. In some implementations, one or more of elements 110-160 may not be present in mobile device. In some implementations, one or more of elements 110-160 may be functional components of a single device, and their separate illustration in FIG. 1 does not necessarily indicate that elements 110-160 are separate components, although they may be. Also, mobile system 100 may include, in some implementations, other elements not explicitly shown in FIG. 1. such as various outputs (e.g., display, audio output, etc.), a power supply, one or more buttons, data and/or charging port(s), and/or other components typically found in mobile systems.

Wireless transceivers 110 may be arranged to transmit and/or receive one or more wireless signals in various protocols. Wireless transceivers 110 may be adjustable (possibly in conjunction with antennas 120) by processor 130 to vary one or more wireless transmission characteristics, such as frequency, channels, transmission power, modulation scheme, etc., although the claimed invention is not limited in this regard. Although shown as different transceivers 110 connected to different antennas 120, in some implementations multiple transceivers 110 may use a single antenna 120. In some implementations, multiple communications protocols may be supported by a single transceiver 110.

Wireless transceivers 110 may include a global positioning system (GPS) transceiver or other dedicated receiver that is capable of producing location information (e.g., latitude and longitude). Wireless transceivers 110 may also include a wireless area network (WAN) transceiver, such as one that supports an Institute of Electrical and Electronics Engineers (IEEE) wireless communication standard like IEEE 802.11a/b/g or IEEE 802.16 or another similarly-used radio frequency (RF) protocol. Wireless transceivers 110 may also include a cellular transceiver, such as one that supports a so-called 3G or 4G cellular communication protocol such as Global System for Mobile Communications (GSM), General Packet Radio Service (GPRS), Enhanced Data GSM Environment (EDGE), European Telecommunications Standards Institute (ETSI), Wideband CDMA (WCDMA), or High-Speed Downlink Packet Access (HSDPA), although cellular transceivers that support other RF protocols than these are both possible and contemplated.

Wireless transceivers 110 may also include an RF wireless communication transceiver, such as one that supports the Bluetooth protocol or an ultrawideband protocol, such as wireless Universal Serial Bus (USB). In some implementations, wireless transceivers 110 may also include a radio or television transceiver that supports, for example, Amplitude Modulation (AM), Frequency Modulation (FM), High Definition (HD) radio, or high definition television (HDTV).

Antennas 120 may include, for example, a directional antenna or an omni-directional antenna, although the claimed invention is not limited thereto. In some implementations, antennas 120 may be tunable in frequency by transceivers 110 or processor 130. As stated before, each antenna 120 may, but need not, correspond to a different transceiver 110. In some implementations, one antenna 120 may be shared by multiple transceivers 110. In some implementations, one transceiver 110 may use multiple antennas 120.

Processor 130 in one implementation may include a single processor, or may include a baseband processor and an applications processor, although the claimed invention is not limited in this respect. According to one implementation, processor 130 may include a microcontroller than is part of a Medium Access Control (MAC). Processor 130 may be coupled to transceivers 110 and memory 140

Memory 140 may include volatile memory such as DRAM, non-volatile memory such as flash memory, or may include other types of storage such as a hard disk drive, although the claimed invention is not limited in this respect. Some portion, or all, of memory 140 may be included on the same integrated circuit as processor 130, or some portion or all of memory 140 may be disposed on an integrated circuit or other medium, for example a hard disk drive, that is external to the integrated circuit of processor 130. According to one implementation, software may be provided in memory 140 to be executed by processor 130 to allow mobile system 100 to perform a variety of tasks, some of which may be described herein. In some implementations, memory 140 may be used to persistently store (e.g., in non-volatile memory) information from a transceiver 110, such as position information.

Communication interface 150 may include a non-wireless communication interface, such as Ethernet, USB, or a custom wired interface that is capable of Internet Protocol (IP) or similar communication. In some implementations, communication interface 150 may include a visual interface, such as a display, for visual communication with a user. In some implementations, communication interface 150 may include an audio interface, such as a speaker, earphone jack, etc., for audible communication with the user.

Input device 160 may include any device that enables user input to system 100. Device 160 may include alphanumeric and other keys. Another possible type of user input device 160 is a cursor controller, such as a mouse, a trackball, a pen, a touch screen, or cursor direction keys for communicating direction information and command selections to processor 130.

Figure 2:
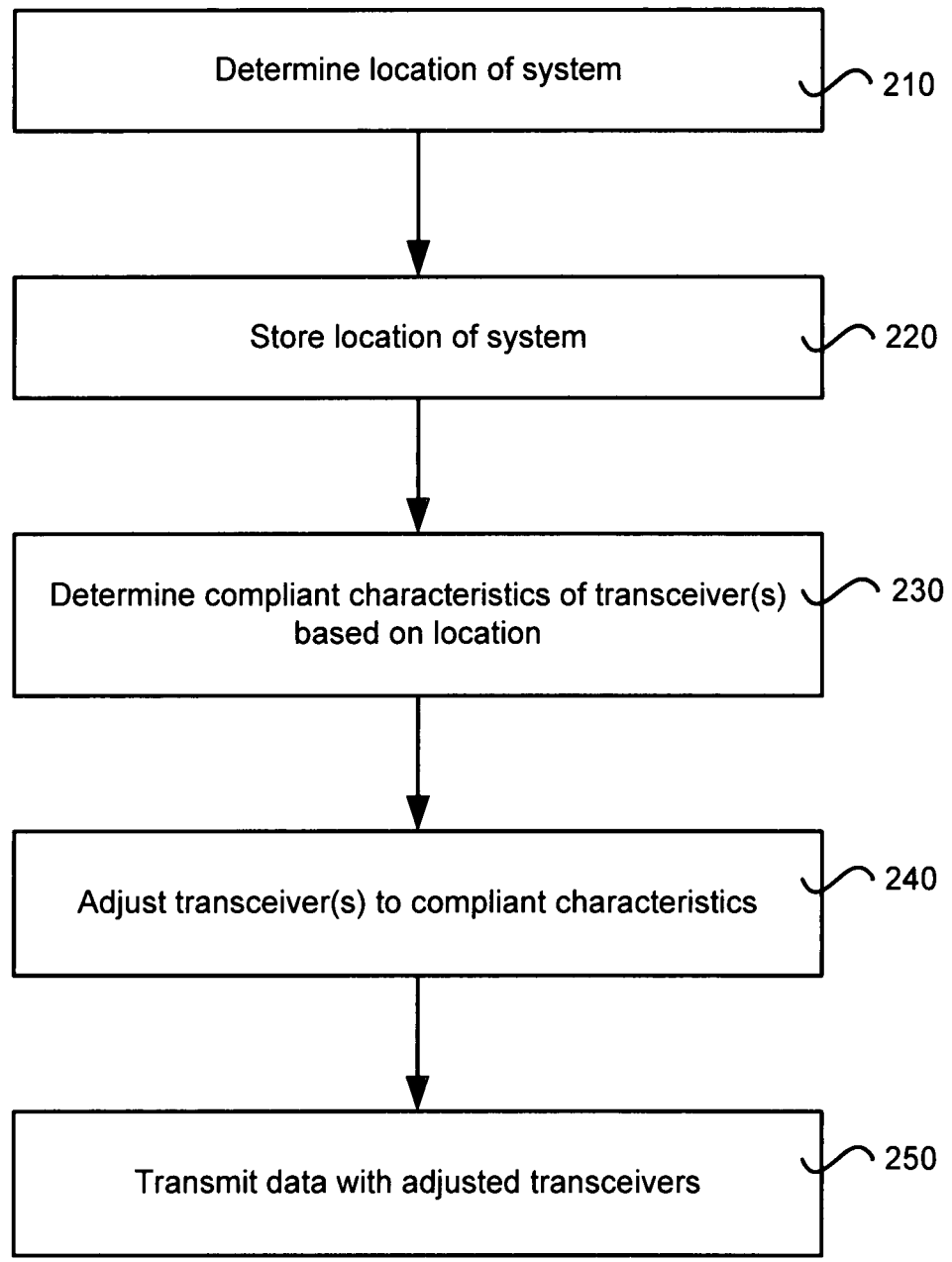
FIG. 2 illustrates a method of adjusting transceiver characteristics based on location according to some implementations.

FIG. 2 illustrates a method of adjusting the characteristics of transceiver(s) 110 based on location of system 100. Although described with respect to FIGS. 1 and 3 for ease of explanation, the scheme described in FIG. 2 should not be construed as limited to the particulars of these other figures.

The method may begin by determining a geographical location of system 100 [act 210]. In some implementations, the ultimate location determined in act 210 may be as course as "within country X," or whatever geographical area typically corresponds to a wireless regulatory regime. In some implementations, however, the location determined by act 210 may be as specific as a set or geographical coordinates, a locality (e.g., a county, town, or city), a region (e.g., a state, province, or other area within a country), etc. In general, the location may be determined by one of the wireless transceivers 110, although other schemes for determining location may also be employed as described further below.

Once determined in act 210, the location of system 100 may be stored [act 220]. In some implementations, the location of system 100 may be stored in act 220 within a non-volatile memory 140. In some implementations, the storing in act 210 will only happen if the location has changed (e.g., is different from a location already stored in memory 140). In some implementations, the storing in act 220 will happen regardless of any previously-stored location information. For clarity, one specific scheme of determining location in acts 210 and 220 will now be described with regard to FIG. 3.

Figure 3:
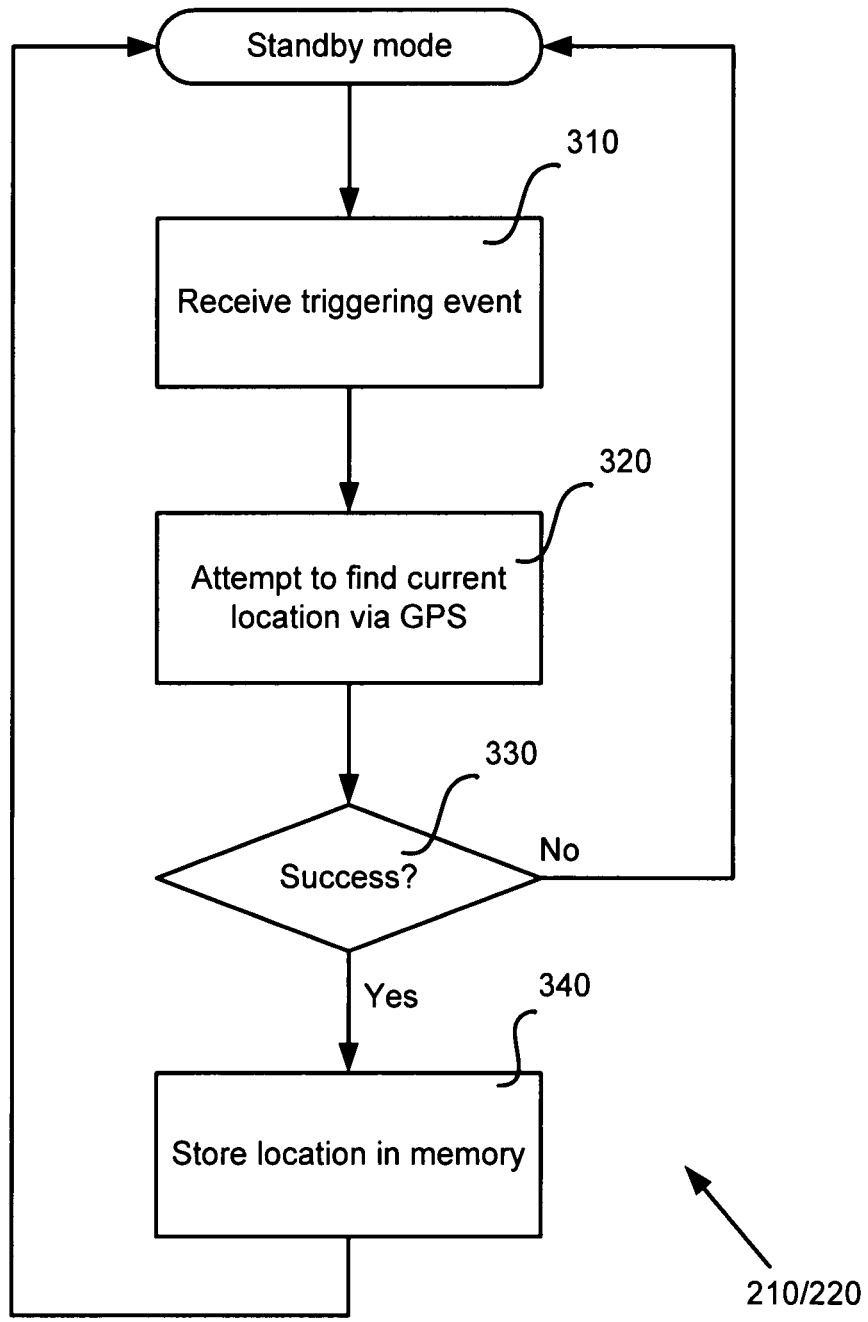
FIG. 3 illustrates one example method of determining and storing location information.

FIG. 3 illustrates one example method of determining and storing location information. System 100 may be in standby mode (e.g., "standby" in the sense of not determining location—system 100 may still be performing other processing or communication functions) until a triggering event is received [act 310]. In some implementations, the triggering event in act 310 may include booting up of system 100 and/or the loading of a driver software for one or more wireless transceivers 110. In some implementations, the triggering event in act 310 may include a user enabling or disabling one or more of the wireless transceivers 110. In some implementations, the triggering event in act 310 may include an occasional or periodic triggering signal according to a predetermined schedule.

The method may continue with a GPS transceiver 110 attempting to find a current location of system 100 [act 320]. If the attempt in act 320 is not successful (e.g., if a GPS signal is unavailable), the method may return to the standby mode. In such a case, the processor 130 may default to and use the last known location that is stored in memory 140.

If the attempt in act 320 is successful, processor 130 may store the location returned from GPS transceiver 110 in memory 140 [act 340]. In some implementations, the location may be stored in memory 140 as a latitude and longitude value in act 340. In some implementations, the location may be stored in memory 140 as a country code or a representation of a regulatory area that encompasses the location. In some implementations, memory 140 may be a non-volatile memory. After the location is stored in act 340, system 100 may again return to a standby mode until another triggering event is received.

Returning to FIG. 2, act 210 may determine the location of system 100 in ways other than that described in FIG. 3 (e.g., via GPS). In some implementations of act 210, for example, a transceiver 110 receiving an IEEE 802.16 signal with country information or other location information embedded therein. In other implementations of act 210, a transceiver 110 may receive another broadcast signal with embedded location information such as that transmitted by a cellular telephone tower, an airport location system, or a non-GPS location system such as Europe's Galileo system. In some implementations of act 210, communication interface 150 may help determine the location of system 100 based on, for example, an IP address of the system. In some implementations, a user of system 100 may manually enter the location of the system via input device 160.

The method may continue with processor 130 determining compliant (e.g., acceptable under the wireless regulations covering the location) characteristics of one or more wireless transceivers 110 based on the location determined in act 210 [act 230]. In some implementations, memory 140 may include acceptable transmission characteristics (e.g., allowable transmission frequencies, channels and/or transmission power) indexed by country or other regulatory regime or area. In act 230, processor 190 may look up such acceptable transmission characteristics based on the location determined in act 210. In some implementations, memory 140 may contain acceptable/allowable/compliant transmission parameters for each type of wireless transceiver 110 in system 100. These compliant values may be updated, if needed, by software update of system 100.

Processor 130 may adjust appropriate transceivers 110 to transmit using the compliant characteristics [act 240]. For example, processor may set the transmission frequencies, transmission channels, or transmission power of a wireless transceiver 110 (e.g., one that transmits data over a WAN or cellular network). For antennas 120 that are tunable, processor 130 and/or transceivers 110 may also tune them, if appropriate or desirable, in act 240.

One or more of the wireless transceivers 110 may transmit data using the compliant characteristics [act 250]. By determining the location of system 100 in act 210, determining regulatorily compliant characteristics in act 230, and adjusting transceiver characteristics appropriately in act 240, data transmission in act 250 is ensured to comply with local regulations in whatever region mobile system 100 resides. Such may also permit a user to fully utilize available channels, transmission power, etc. in a given regulatory region.

The above-described scheme and/or system may advantageously permit mobile system 100 to dynamically alter the frequencies, power, etc. at which it will operate based on its geographical location. Such agility enables compliance with local regulatory requirements without resort to special-purpose hardware or location-specific drivers. Such a system or scheme as described above may also permit a device or subsystem manufacturer to reduce or eliminate separate stock keeping units (SKUs) that are based on wireless regulatory regions in favor of a single (or very small number of) SKU, and may lessen the costs of original equipment manufacturers (OEMs) of stocking multiple "regulatory" SKUs.

The foregoing description of one or more implementations provides illustration and description, but is not intended to be exhaustive or to limit the scope of the invention to the precise form disclosed. Modifications and variations are possible in light of the above teachings or may be acquired from practice of various implementations of the invention.

For example, although location information has been described as being stored in memory, a proxy for location could be stored instead. For example, if there are an integer N wireless regulatory regimes in the world, an integer from 1 to N could be stored corresponding to a wireless regulatory regime in which the location of the mobile system falls. Other variations on mapping location to regulation-compliant wireless characteristics are both possible and contemplated.

No element, act, or instruction used in the description of the present application should be construed as critical or essential to the invention unless explicitly described as such. Also, as used herein, the article "a" is intended to include one or more items. Variations and modifications may be made to the above-described implementation(s) of the claimed invention without departing substantially from the spirit and principles of the invention. All such modifications and variations are intended to be included herein within the scope of this disclosure and protected by the following claims.

What is claimed:

1. A method of dynamically adjusting a wireless transceiver, comprising:
   receiving a triggering event comprising an enablement of the wireless transceiver;
   based on receiving the triggering event, exiting a standby mode and acquiring a geographical location of the wireless transceiver;
   using a last known location if acquiring the geographical location of the wireless transceiver is unsuccessful;
   determining transmission characteristics that are compliant with wireless regulations covering the geographical location or the last known location;
   adjusting the wireless transceiver to conform to the transmission characteristics, wherein the adjusting comprises changing one or more of a transmission frequency and a transmission power of the wireless transceiver and tuning one or more tunable antennas based on the transmission characteristics; and
   transmitting data with the adjusted wireless transceiver, using the one or more tunable antennas.

2. The method of claim 1, further comprising:
   storing the geographical location in a memory.

3. The method of claim 1, wherein the acquiring includes:
   receiving a global positioning signal with a global positioning system receiver, and
   calculating the geographical location from the global positioning signal.

4. The method of claim 1, wherein the acquiring includes:
   receiving a wireless area network signal including location information embedded therein.

5. The method of claim 1, wherein the acquiring includes:
   receiving a cellular telephone signal including location information embedded therein.

6. The method of claim 1, wherein the determining includes:
   looking up the transmission characteristics based on the geographical location.

7. A machine-readable medium having stored thereon instructions, which if executed by a machine comprising a wireless transceiver causes the machine to perform a method comprising:
   receiving a triggering event comprising an enablement of the wireless transceiver;
   based on receiving the triggering event, exiting a standby mode and determining a geographical location of the machine;
   using a last known location if acquiring the geographical location of the wireless transceiver is unsuccessful;
   ascertaining transmitter characteristics that are compliant with regulations in a regulatory area based on the geographical location or the last known location; and
   adjusting a wireless transceiver to wirelessly transmit data according to the transmitter characteristics using one or more tunable antennas, wherein the adjusting includes setting one or more of a transmission frequency and a transmission power for the wireless transceiver and tuning the one or more tunable antennas based on the transmitter characteristics.

8. The medium of claim 7, further comprising instructions, which if executed by a machine causes the machine to perform:
   storing the geographical location.

9. The medium of claim 7, wherein the determining includes:
   determining the geographical location based on a received global positioning system signal.

10. The medium of claim 7, wherein the determining includes:
    determining the geographical location based on a received radio frequency signal having location information embedded therein.

11. The medium of claim 7, wherein the ascertaining includes:
    finding the regulatory area that includes the geographical location, and
    looking up the transmitter characteristics based on the regulatory area.

12. A system to wirelessly transmit data, comprising:
    a first transceiver to exit a standby mode and extract a geographical location of the system from a received signal, based on receipt of a triggering event;

a second adjustable transceiver to wirelessly transmit data in accordance with input transmission parameters, the triggering event comprising an enablement of the second adjustable transceiver;

a tunable antenna coupled to the first transceiver or the second adjustable transceiver;

a memory to store a set of transmission parameters that is indexed by geography; and a processor connected to the first transceiver, the second adjustable transceiver, and the memory to choose the input transmission parameters from the set of transmission parameters based on the geographical location of the system and to adjust the second adjustable transceiver with the input transmission parameters, wherein the input transmission parameters further include one or more transmission powers and the adjusting comprises tuning the tunable antenna based on the input transmission parameters.

13. The system of claim 12, wherein the first transceiver is arranged to extract the geographical location from a received global positioning system signal.

14. The system of claim 12, wherein the first transceiver is arranged to extract the geographical location from a received radio frequency signal.

15. The system of claim 12, wherein the second transceiver is arranged to wirelessly transmit data according to a wireless area network protocol.

16. The system of claim 12, wherein the second transceiver is arranged to wirelessly transmit data according to a cellular communication protocol.

17. The system of claim 12, wherein the processor is further arranged to store the geographical location of the system in the memory.

18. The system of claim 12, further comprising:
a third adjustable transceiver to wirelessly transmit data in accordance with other transmission parameters using a communication protocol different from the second adjustable transceiver,
wherein the processor is further arranged to choose the other transmission parameters from the set of transmission parameters based on the geographical location of the system and to adjust the third adjustable transceiver with the other transmission parameters.

19. The system of claim 12, wherein the input transmission parameters include one or more transmission frequencies or channels.

20. An apparatus to wirelessly transmit data, comprising:
a wireless transceiver;
one or more tunable antennas; and
a processor operative to:
receive a triggering event comprising an enablement of the wireless transceiver;
based on receiving the triggering event, exit a standby mode and acquire a geographical location of the wireless transceiver;
using a last known location if acquiring the geographical location of the wireless transceiver is unsuccessful;
determine transmission characteristics that are compliant with wireless regulations covering the geographical location or the last known location;
adjust the wireless transceiver to conform to the transmission characteristics, wherein the adjusting comprises changing one or more of a transmission frequency and a transmission power of the wireless transceiver and tuning the one or more tunable antennas based on the transmission characteristics; and
transmit data with the adjusted wireless transceiver, using the one or more tunable antennas.

21. The apparatus of claim 20, the processor operative to store the geographical location in a memory.

22. The apparatus of claim 20, the processor operative to:
receive a global positioning signal with a global positioning system receiver, and
calculate the geographical location from the global positioning signal.

23. The apparatus of claim 20, the processor operative to:
receive a wireless area network signal including location information embedded therein.

24. The apparatus of claim 20, the processor operative to:
receive a cellular telephone signal including location information embedded therein.

25. The apparatus of claim 20, the processor operative to:
look up the transmission characteristics based on the geographical location.

* * * * *